(12) United States Patent
Bamba et al.

(10) Patent No.: US 10,309,045 B2
(45) Date of Patent: Jun. 4, 2019

(54) FIBER-REINFORCED RESIN FORMING MATERIAL AND METHOD OF PRODUCING SAME

(71) Applicant: Toray Industries, Inc., Tokyo (JP)

(72) Inventors: Kenta Bamba, Nagoya (JP); Tetsuya Motohashi, Nagoya (JP); Katsuhiro Miyoshi, Nagoya (JP); Takafumi Hashimoto, Nagoya (JP)

(73) Assignee: Toray Industries, Inc. (JP)

( * ) Notice: Subject to any disclaimer, the term of this patent is extended or adjusted under 35 U.S.C. 154(b) by 58 days.

(21) Appl. No.: 15/562,510

(22) PCT Filed: Mar. 17, 2016

(86) PCT No.: PCT/JP2016/058443
§ 371 (c)(1),
(2) Date: Sep. 28, 2017

(87) PCT Pub. No.: WO2016/158436
PCT Pub. Date: Oct. 6, 2016

(65) Prior Publication Data
US 2018/0094368 A1  Apr. 5, 2018

(30) Foreign Application Priority Data

Mar. 30, 2015  (JP) ................. 2015-068530

(51) Int. Cl.
| | |
|---|---|
| *D04H 1/4242* | (2012.01) |
| *C08J 5/06* | (2006.01) |
| *C08K 3/04* | (2006.01) |
| *C08K 3/013* | (2018.01) |
| *C08J 5/04* | (2006.01) |

(52) U.S. Cl.
CPC ............ *D04H 1/4242* (2013.01); *C08J 5/042* (2013.01); *C08J 5/06* (2013.01); *C08K 3/013* (2018.01); *C08K 3/046* (2017.05); *C08J 2300/22* (2013.01); *C08J 2300/24* (2013.01); *C08J 2363/10* (2013.01)

(58) Field of Classification Search
CPC ..... D04H 1/4242; C08J 5/042; C08J 2300/24; C08J 2300/22; C08K 3/013; C08K 3/046
USPC .......................................... 524/495
See application file for complete search history.

(56) References Cited

U.S. PATENT DOCUMENTS 5,194,462 A * 3/1993 Hirasaka ............... B29C 70/12
428/299.4

FOREIGN PATENT DOCUMENTS

| | | |
|---|---|---|
| JP | 3-47740 | 2/1991 |
| JP | 5-140335 | 6/1993 |
| JP | 05140335 A * | 6/1993 |
| JP | 2006-77343 | 3/2006 |
| JP | 2008-174605 | 7/2008 |
| JP | 2008174605 A * | 7/2008 |
| JP | 2009-62474 | 3/2009 |
| JP | 2009-191116 | 8/2009 |
| JP | 2010-163536 | 7/2010 |
| JP | 2013-20289 | 1/2013 |
| JP | 2013-49750 | 3/2013 |
| JP | 2013049750 A * | 3/2013 |
| WO | 2016/043037 | 3/1916 |
| WO | 2014/021315 | 2/2014 |

* cited by examiner

*Primary Examiner* — Hui H Chin
(74) *Attorney, Agent, or Firm* — DLA Piper LLP (US)

(57) ABSTRACT

A fiber-reinforced resin forming material contains at least a matrix resin and bundled aggregates of discontinuous reinforcing fibers, wherein: the bundled aggregates include both reinforcing fiber aggregates A having a shape formed by cutting after having performed a splitting treatment to completely split the strands of continuous reinforcing fibers into a plurality of bundles of strands, and reinforcing fiber aggregates B1 having a shape that includes unsplit parts where splitting treatment was inadequate and/or reinforcing fiber aggregates B2 having a shape not subjected to splitting treatment; and both the ratio of the weight of the reinforcing fiber aggregates B1 with respect to the total weight of reinforcing fibers in the fiber-reinforced resin forming material, and the ratio of the total weight of the reinforcing fiber aggregates B1 and the reinforcing fiber aggregates B2 with respect to the total weight of reinforcing fibers in the fiber-reinforced resin forming material, are 50-95%.

5 Claims, 1 Drawing Sheet

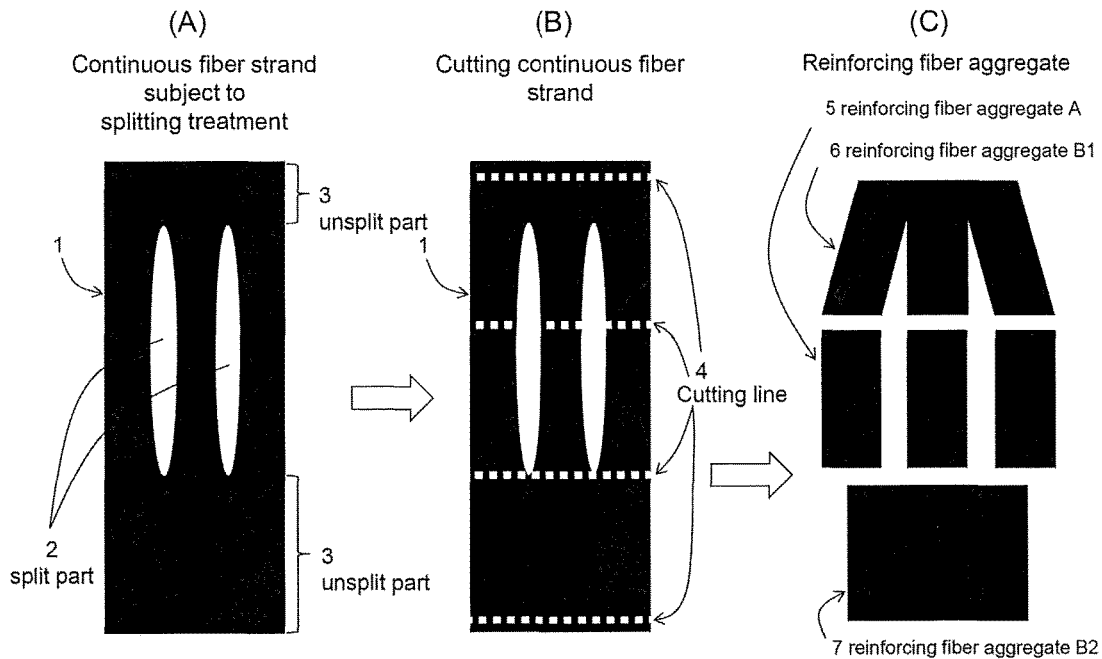
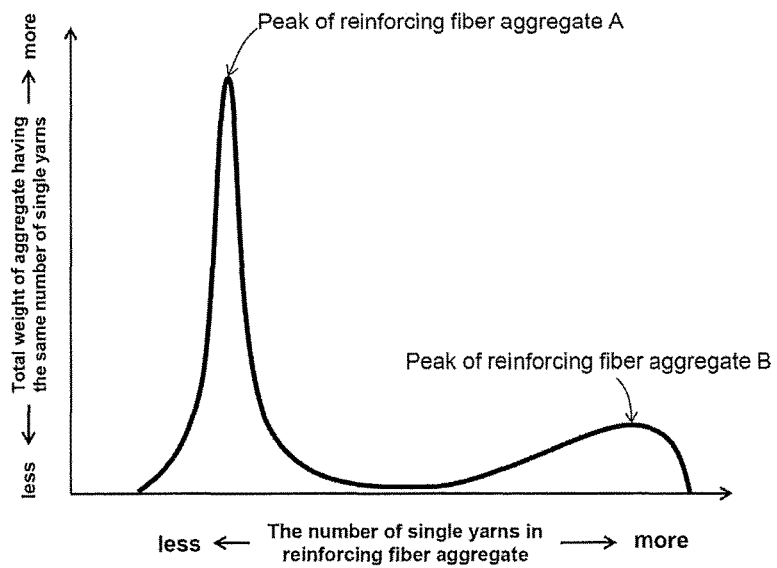

FIBER-REINFORCED RESIN FORMING MATERIAL AND METHOD OF PRODUCING SAME

TECHNICAL FIELD

This disclosure relates to a fiber-reinforced resin forming material and a method of producing the same, specifically achieving a good fluidity of forming material in a forming process and mechanical properties excellent in formed product in a balanced manner.

BACKGROUND

JP 2013-20289-A, JP 2008-174605-A, JP 2009-191116-A, JP 2010-163536-A and WO 2014/021315 disclose technologies to form a product having a desirable shape by heating and pressing fiber-reinforced forming material comprising bundled aggregate of discontinuous reinforcing fiber, such as carbon fiber, and matrix resin, such as thermosetting resin. When such a conventional fiber-reinforced resin forming material comprises fiber bundles consisting of a predetermined strand containing many single yarns, a formed product tends to have poor mechanical properties in spite of excellent fluidity in forming.

JP 2013-20289-A discloses a forming material of which chopped fiber bundle has a filament number of 10,000-700,000. Although such a forming material may have an excellent fluidity derived from many pieces of filaments of fiber bundles to allow the fiber bundles of reinforcing fiber to move efficiently with resin in a forming process, the formed product might be broken as generating stress concentration at ends of fiber bundle in the formed product and, therefore, such a forming material is not suitable for forming a formed product requiring high level mechanical properties.

JP 2008-174605-A discloses a fiber-reinforced resin made from split fiber bundles having 100 or less pieces of single yarns. Although such a fiber bundle having less pieces of single yarns than the single yarns of JP 2013-20289-A can disperse reinforcing fiber well in the formed product to enhance mechanical properties of formed product because of decreased possibility to generate stress concentration at ends of fiber bundle in the formed product, the fluidity might not be greater than expected in the forming process.

As described above, a fiber-reinforced resin forming material made from fiber bundles having many pieces of single yarns tends to have a good productivity and an excellent fluidity in a forming process in spite of poor mechanical properties. Adversely, a fiber-reinforced resin forming material made from fiber bundles having less pieces of single yarns tends to have excellent mechanical properties of the formed product in spite of suppressed fluidity in a forming process.

Accordingly, it could be helpful to provide a fiber-reinforced resin forming material and a method of producing the same capable of achieving both good fluidity in forming products and excellent mechanical properties of the product in a balanced manner.

SUMMARY

We thus provide:

A fiber-reinforced resin forming material contains at least a bundled aggregate of discontinuous reinforcing fibers and a matrix resin, wherein the bundled aggregate of reinforcing fibers includes both a reinforcing fiber aggregate A formed by cutting a strand of continuous reinforcing fibers after a splitting treatment is performed to completely split the strand into a plurality of bundles, and a reinforcing fiber aggregate B1 having a shape of an unsplit part to which the splitting treatment is performed insufficiently and/or a reinforcing fiber aggregate B2 having a shape to which the splitting treatment is not performed, characterized in that both a ratio (i) of weight of the reinforcing fiber aggregate B1 with respect to a total weight of reinforcing fibers in the fiber-reinforced resin forming material, and a ratio (ii) of a total weight of the reinforcing fiber aggregate B1 and the reinforcing fiber aggregate B2 with respect to the total weight of reinforcing fibers in the fiber-reinforced resin forming material, are 50 to 95%.

The forming material contains both reinforcing fiber aggregate A (namely, reinforcing fiber aggregate A of which number of single yarns is relatively small because of the splitting treatment) formed by cutting a strand of continuous reinforcing fibers after a splitting treatment is performed to completely split the strand into a plurality of bundles, and a reinforcing fiber aggregate B1 having a shape of an unsplit part to which the splitting treatment is performed insufficiently and/or a reinforcing fiber aggregate B2 (namely, reinforcing fiber aggregate B of which number of single yarns is relatively large) having a shape to which the splitting treatment is not performed, wherein both a ratio (i) of weight of the reinforcing fiber aggregate B1 with respect to a total weight of reinforcing fibers in the fiber-reinforced resin forming material, and a ratio (ii) of a total weight of the reinforcing fiber aggregate B1 and the reinforcing fiber aggregate B2 with respect to the total weight of reinforcing fibers in the fiber-reinforced resin forming material, are 50 to 95%. The reinforcing fiber aggregate A with less number of single yarns can contribute to the improvement of mechanical properties of formed product while the reinforcing fiber aggregate B with more number of single yarns can contribute to the improvement of fluidity in the forming process. When the weight ratio of reinforcing fiber aggregate B is controlled within a certain range, both the fluidity and mechanical properties as characteristics of target range are achieved in a balanced manner.

It is preferable that a ratio of the weight of the reinforcing fiber aggregate B1 with respect to the total weight of the reinforcing fiber aggregate B1 and the reinforcing fiber aggregate B2 is more than 4%. The weight ratio of reinforcing fiber aggregate B1 of less than 4% might have an increased possibility to generate a stress concentration at an end of aggregate of reinforcing fiber aggregate B2 to deteriorate mechanical properties. When the weight ratio of reinforcing fiber aggregate B1 is 100%, high mechanical properties are expected because the stress can smoothly be transmitted at a part of reinforcing fiber aggregate B1 to which the splitting treatment is partially performed to prevent the stress concentration from generating.

It is preferable that the reinforcing fiber aggregate A and the reinforcing fiber aggregate B have an average fiber length of 5 to 100 mm. The average fiber length of less than 5 mm might have insufficient reinforcement by reinforcing fibers in the formed product while the average fiber length of more than 100 mm might deteriorate fluidity in the forming process or might have too flexible reinforcing fibers.

It is preferable that each of the reinforcing fiber aggregate A has a number of single yarns of 800 to 10,000 pieces of the reinforcing fiber aggregate A in the fiber-reinforced resin forming material. When the number of single yarns of reinforcing fiber aggregate A is less than 800 pieces, fluidity might deteriorate greatly in the forming process in spite of high mechanical properties of the formed product. Although fluidity improvement could be expected, the number of more than 1,000 pieces might generate stress concentration in the formed product and have insufficient mechanical properties and unclear difference between reinforcing fiber aggregate A and reinforcing fiber aggregate B formed through the splitting treatment to spoil the basic concept of our invention that reinforcing fiber aggregates A and B should be well blended.

The reinforcing fiber is not limited particularly and may be carbon fiber, glass fiber, aramid fiber or combinations thereof. It is preferable that the reinforcing fiber is a carbon fiber so that our invention can particularly be applied advantageously.

It is possible that the matrix resin comprises a thermosetting resin or a thermoplastic resin.

Further, we also provide a production method for the above-described fiber-reinforced resin forming material. Namely, we also provide a method of producing a fiber-reinforced resin forming material containing at least a bundled aggregate of discontinuous reinforcing fibers and a matrix resin, wherein the bundled aggregate of reinforcing fibers includes both a reinforcing fiber aggregate A formed in a shape made by cutting a strand of continuous reinforcing fibers after a splitting treatment is performed to completely split the strand into a plurality of bundles, and a reinforcing fiber aggregate B1 having a shape of an unsplit part to which the splitting treatment is performed insufficiently and/or a reinforcing fiber aggregate B2 having a shape to which the splitting treatment is not performed, controlling the reinforcing fiber aggregate B used in the fiber-reinforced resin forming material to have a range of 50 to 95% in a ratio (i) of weight of the reinforcing fiber aggregate B1 with respect to a total weight of reinforcing fibers, or a ratio (ii) of a total weight of the reinforcing fiber aggregate B1 and the reinforcing fiber aggregate B2 with respect to the total weight of reinforcing fibers.

Accordingly, we can provide a fiber-reinforced resin forming material and a method of producing the same capable of achieving both good fluidity in forming products and excellent mechanical properties of the product in a balanced manner. Further, a large tow containing many single yarns can be employed as a strand of continuous reinforcing fiber for preparing reinforcing fiber aggregates A and B, so that improvement of productivity and reduction of production cost become possible.

BRIEF DESCRIPTION OF THE DRAWINGS

FIG. 1 is a schematic plan view showing an example of forming process of reinforcing fiber aggregate A and reinforcing fiber aggregate B.

, FIG. 2 is a graph showing an example of distribution of reinforcing fiber aggregate in the fiber-reinforced resin forming material.

EXPLANATION OF SYMBOLS

1: continuous reinforcing fiber strand
2: split part
3: unsplit part
4: cutting line
5: reinforcing fiber aggregate A
6: reinforcing fiber aggregate B1
7: reinforcing fiber aggregate B2

DETAILED DESCRIPTION

Hereinafter, our materials and methods will be explained with reference to the figures.

Our fiber-reinforced resin forming material contains at least a bundled aggregate of discontinuous reinforcing fibers and a matrix resin, wherein the bundled aggregate of reinforcing fibers includes both reinforcing fiber aggregate A formed by cutting a strand of continuous reinforcing fibers after a splitting treatment is performed to completely split the strand into a plurality of bundles, and reinforcing fiber aggregate B1 having a shape of an unsplit part to which the splitting treatment is performed insufficiently and/or reinforcing fiber aggregate B2 having a shape to which the splitting treatment is not performed, characterized in that both ratio (i) of weight of reinforcing fiber aggregate B1 with respect to total weight of reinforcing fibers in the fiber-reinforced resin forming material, and ratio (ii) of total weight of reinforcing fiber aggregate B1 and reinforcing fiber aggregate B2 with respect to total weight of reinforcing fibers in the fiber-reinforced resin forming material, are 50 to 95%. Alternatively, our method of producing a fiber-reinforced resin forms material containing at least a bundled aggregate of discontinuous reinforcing fibers and a matrix resin, wherein the bundled aggregate of reinforcing fibers includes both reinforcing fiber aggregate A formed in a shape made by cutting a strand of continuous reinforcing fibers after a splitting treatment is performed to completely split the strand into a plurality of bundles, and reinforcing fiber aggregate B1 having a shape of an unsplit part to which the splitting treatment is performed insufficiently and/or reinforcing fiber aggregate B2 having a shape to which the splitting treatment is not performed, controlling reinforcing fiber aggregate B used in the fiber-reinforced resin forming material to 50 to 95% both in ratio (i) of weight of reinforcing fiber aggregate B1 with respect to total weight of reinforcing fibers, and ratio (ii) of total weight of reinforcing fiber aggregate B1 and reinforcing fiber aggregate B2 with respect to total weight of reinforcing fibers.

FIG. 1 shows an example of reinforcing fiber aggregate A and reinforcing fiber aggregate B. The vertical direction in FIG. 1 indicates a direction in which continuous reinforcing fibers of the strand extend. FIG. 1 (A) shows continuous reinforcing fiber strand 1 viewed in a longitudinal direction, in which split part 2 and unsplit part 3 are formed where split part 2 is subject to a splitting treatment to completely split strand 1 into a plurality of bundles in a width direction of strand 1 while unsplit part 3 is subject to an insufficient splitting treatment or no splitting treatment. When strand 1 is cut at the positions of cutting lines 4 as shown in FIG. 1 (B) after the splitting treatment is performed, reinforcing fiber aggregate A (5) formed by cutting after the splitting treatment, reinforcing fiber aggregate B1 (6) including unsplit parts which have been split insufficiently, and reinforcing fiber aggregate B2 (7) including unsplit parts which have never been split are formed as shown in FIG. 1 (C). FIG. 1 (C) shows an example in which reinforcing fiber aggregate B1 (6) and reinforcing fiber aggregate B2 (7) are formed, although reinforcing fiber aggregate B2 (7) may not be formed according to the positions of split fibers or cutting lines. Namely, reinforcing fiber aggregate B may include reinforcing fiber aggregate B1 (6) only (case i) or include both reinforcing fiber aggregate B1 (6) and reinforcing fiber aggregate B2 (7) (case ii).

A number of both reinforcing fiber aggregates A and reinforcing fiber aggregates B formed as described above are used with matrix resin to form a fiber-reinforced resin forming material by controlling the material to 50 to 95% both in ratio (i) of weight of reinforcing fiber aggregate B1 with respect to total weight of reinforcing fibers, and ratio (ii) of total weight of reinforcing fiber aggregate B1 and reinforcing fiber aggregate B2 with respect to total weight of reinforcing fibers in the fiber-reinforced resin forming material.

FIG. 2 shows an example of distribution of reinforcing fiber aggregate in the fiber-reinforced resin forming material provided for the above-described forming process. FIG. 2 shows a graph having a vertical axis of the number of single yarns contained in the reinforcing fiber aggregate and a horizontal axis of total weight of reinforcing fiber aggregates having the same number of single yarns, in which reinforcing fiber aggregate A having less number of single yarns and reinforcing fiber aggregate B having more number of single yarns have each peak with respect to weight of the horizontal axis. The area below the curve to be calculated as a value of integral is regarded as total weight of reinforcing fiber in the material while the area below the curve in a region having the number of single yarns more than a certain value is regarded as the weight of reinforcing fiber aggregate B. The amount of usage of reinforcing fiber aggregate B is controlled to 50 to 95% both in ratio (i) of weight of reinforcing fiber aggregate B1 with respect to total weight of reinforcing fibers, and ratio (ii) of total weight of the reinforcing fiber aggregate B1 and reinforcing fiber aggregate B2 with respect to total weight of reinforcing fibers in the fiber-reinforced resin forming material.

The reinforcing fiber is not limited particularly and may be carbon fiber, glass fiber, aramid fiber or combinations thereof. It is preferable that the reinforcing fiber is a carbon fiber so that our invention can particularly be applied advantageously. It is preferable that the carbon fiber has an average fiber diameter of 3 to 12 μm, preferably 5 to 9 μm.

It is preferable that the carbon fiber is immersed in a solution dispersing a resin in a solvent such as water and then is dried to perform a sizing treatment. It is preferable that the sizing treatment is performed with a sizing agent which is a resin compatible with the matrix resin, preferably a resin of the same kind as the matrix resin, although it is not limited particularly.

It is possible that the matrix resin is a thermosetting resin or a thermoplastic resin. For example, any thermosetting resin may be used to form a carbon fiber composite material to the extent that mechanical properties of formed product are not deteriorated substantially. The matrix resin may be vinyl ester resin, epoxy resin, unsaturated polyester resin, phenolic resin, epoxy acrylate resin, urethane acrylate resin, phenoxy resin, alkyd resin, urethane resin, maleimide resin, cyanate resin or the like. Above all, it is preferable to employ the vinyl ester resin, epoxy resin, unsaturated polyester resin, phenol resin or mixtures thereof.

The thermoplastic resin can be selected appropriately to the extent that mechanical properties of formed product are not deteriorated substantially. The thermoplastic resin may be polyolefin resin such as polyethylene resin and polypropylene resin, polyamide-based resin such as nylon 6 resin and nylon 6,6 resin, polyester-based resin such as polyethylene terephthalate resin and polybutylene terephthalate resin, polyphenylene sulfide resin, polyether ketone resin, polyethersulfone resin, aromatic polyamide resin or the like. Above all, it is preferable to employ the polyamide resin, polypropylene resin or the polyphenylene sulfide resin.

The continuous fiber to which the fiber splitting treatment is performed has a part in which continuous reinforcing fiber is split into a plurality of fiber bundles. It is possible that the continuous fiber to which the splitting treatment is performed is prepared by blowing air periodically and locally in a direction orthogonally to the fiber longitudinal direction of continuous reinforcing fiber, although the fiber splitting treatment is not limited particularly thereto.

As shown in FIG. 1 (B), the continuous reinforcing fiber strand to which the fiber splitting treatment is performed is fed to a cutting step for cutting into a predetermined length. It is possible that the strand is cut with a mechanical cutter intermittently by a predetermined pitch in the longitudinal direction, although various alternatives are available.

As shown in FIG. 1 (C), nonwoven fabric of reinforcing fiber aggregates is formed by spreading reinforcing fiber aggregate A formed by cutting after the splitting treatment is performed, and reinforcing fiber aggregate B1 having a shape of an unsplit part to which the splitting treatment is performed insufficiently and/or reinforcing fiber aggregate B2 having a shape to which the splitting treatment is not performed. In the nonwoven fabric formed by the spreading step controlling the material to have a range of 50 to 95% both in ratio (i) of weight of the reinforcing fiber aggregate B1 with respect to total weight of reinforcing fibers, and ratio (ii) of total weight of reinforcing fiber aggregate B1 and reinforcing fiber aggregate B2 with respect to total weight of reinforcing fibers, it is possible that reinforcing fiber aggregate A, reinforcing fiber aggregate B1 and reinforcing fiber aggregate B2 are separately sampled and then are mixed in a predetermined ratio. Alternatively, the ratio of reinforcing fiber aggregate B1 only (i) or reinforcing fiber aggregate B1 and reinforcing fiber aggregate B2 (ii) relative to total weight of reinforcing fiber can be estimated almost precisely by considering the area ratio of the part subject to the splitting treatment with respect to total flat surface area of continuous reinforcing fiber strand and the cut length. Once such a weight ratio is set within the predetermined range by setting the conditions of splitting treatment and cutting treatment, a desirable nonwoven fabric can be prepared simply by spreading all the reinforcing fiber aggregates obtained after the cutting treatment.

It is preferable that the reinforcing fiber is contained by a weight content of 30 to 60% with respect to total weight of the fiber-reinforced resin forming material. It is more preferable that the weight content is 35 to 50%.

The fiber length of the reinforcing fiber aggregate can be measured with precision less than 1 mm unit with a microscope or a vernier caliper. When fiber lengths are not uniform among single yarns in the reinforcing fiber aggregate, the fiber length can be calculated geometrically. For example, an average of the longest fiber length and the shortest fiber length of a reinforcing fiber aggregate which has been cut obliquely to the fiber direction in the cutting step can be regarded as a fiber length of the reinforcing fiber aggregate. It is preferable that the reinforcing fiber aggregates have an average fiber length of 5 to 100 mm, preferably 10 to 80 mm. It is possible that the fiber length has a distribution of single fiber length or a mixture of two or more kinds of fiber length.

The weight of reinforcing fiber aggregate can be determined by adding a sample of each reinforcing fiber aggregate up, desirably with precision of less than 1/100 mg.

The number of single yarns in the reinforcing fiber aggregate is calculated by formula (1).

Number of single yarns in reinforcing fiber aggregate [pieces]=Aggregate weight [g]×Fiber length [m]/Fineness [g/m]     (1)

Reinforcing fiber aggregate A in the fiber-reinforced resin forming material may contain a small portion of aggregate which has been split further in a cutting step after a splitting treatment, a spreading step and a resin impregnation step. It is preferable that each reinforcing fiber aggregate A has the number of single yarns of 800 to 10,000 pieces. Further, it is preferable that the number of aggregates and total weight of aggregate A existing in range a in which difference between the upper and lower limits set arbitrarily is 1,000 or less pieces are the greatest.

Reinforcing fiber aggregate B in the fiber-reinforced resin forming material may contain a small portion of aggregate which has been split further in a cutting step after a splitting treatment, a spreading step and a resin impregnation step. It is preferable that a reinforcing fiber aggregate having the number of single yarn of more than a predetermined number of single yarn of reinforcing fiber aggregate A in the fiber-reinforced resin forming material is regarded as reinforcing fiber aggregate B.

It is preferable that reinforcing fiber aggregate B1 in the fiber-reinforced resin forming material includes an unsplit part having been split insufficiently on at least one end part in a fiber direction of reinforcing fiber aggregate B1. It is also preferable that the end part is widened in a width in a direction orthogonal to the fiber direction.

Ratio B [%] of weight of reinforcing fiber aggregate B with respect to total weight of carbon fiber in the fiber-reinforced resin forming material is calculated by formula (2).

Weight ratio $B$=Weight of reinforcing fiber aggregate $B$/Total weight of carbon fiber in fiber-reinforced resin forming material×100 (2)

Ratio B1 [%] of weight of reinforcing fiber aggregate B1 with respect to total weight of reinforcing fiber aggregate B (reinforcing fiber aggregate B1 and reinforcing fiber aggregate B2) in the fiber-reinforced resin forming material is calculated by formula (3).

Weight ratio $B1$=Weight of reinforcing fiber aggregate $B1$/Total weight of reinforcing fiber aggregate $B$(reinforcing fiber aggregate $B1$ and reinforcing fiber aggregate $B2$) in fiber-reinforced resin forming material×100 (3)

EXAMPLES

Hereinafter, Examples will be explained although this disclosure is not limited thereto.

Unless being specifically annotated, the length (fiber length) is represented by unit [mm] while the weight is represented by unit [g] for the fiber-reinforced resin forming material and its sample. Carbon fibers and thermosetting resins as follow are employed in Examples and Comparative Examples.

Carbon fiber: "Panex (registered trademark) R 35 Tow" produced by Zoltek companies, Inc. (fiber diameter 7.2 μm, strand 50K (K means a unit of 1,000 pieces), tensile strength 4,137 MPa)

Matrix resin: vinyl ester resin (produced by the DOW Chemical Company, "DERAKANE" (registered trademark))

Curing agent: tert-butyl peroxyl benzoate (produced by Nippon Oil & Fats Co., Ltd., "PERBUTYL Z" (registered trademark))

Thickener: magnesium oxide (produced by Kyowa Chemical Industry Co., Ltd., MgO #40)

How to Determine Weight Ratio of Fiber-Reinforced Resin Forming Material

A sample of fiber-reinforced resin forming material cut into 100 mm×100 mm is heated in a furnace at 600° C. for 1 hour to remove resin. The weight of the sample from which resin has been removed is measured to determine the total weight of carbon fiber in the fiber-reinforced resin forming material. All reinforcing fiber aggregates are taken with tweezers out from the sample to determine the weight of each reinforcing fiber aggregate. Scales capable of measuring even 1/100 mg is used to measure the weight. The fiber length of each reinforcing fiber aggregate taken out with tweezers is measured with a vernier caliper by 1 mm unit. The number of single yarns in each reinforcing fiber aggregate is calculated by formula (1).

Number of single yarns in reinforcing fiber aggregate [pieces]=Aggregate weight [g]×Fiber length [m]/Fineness [g/m] (1)

Total weight of reinforcing fiber aggregate A defined as a reinforcing fiber aggregate being subject to a splitting treatment to have an arbitrarily designated range of the number of single yarn is measured. Further, total weight of reinforcing fiber aggregate B defined as a reinforcing fiber aggregate having the number of single yarn of more than reinforcing fiber aggregate A is measured. Ratio B [%] of weight of reinforcing fiber aggregate B with respect to total weight of carbon fiber in the fiber-reinforced resin forming material is calculated by formula (2).

Weight ratio $B$=Weight of reinforcing fiber aggregate $B$/Total weight of carbon fiber in fiber-reinforced resin forming material×100 (2)

Weight of reinforcing fiber aggregate B1 is measured where reinforcing fiber aggregate B1 is defined as a reinforcing fiber of which width in a direction orthogonal to the fiber direction of reinforcing fiber aggregate B is partially widened. Ratio B1 [%] of weight of reinforcing fiber aggregate B1 with respect to total weight of reinforcing fiber aggregate B (reinforcing fiber aggregate B1 and reinforcing fiber aggregate B2) in the fiber-reinforced resin forming material is calculated by formula (3).

Weight ratio $B1$=Weight of reinforcing fiber aggregate $B1$/Total weight of reinforcing fiber aggregate $B$(reinforcing fiber aggregate $B1$ and reinforcing fiber aggregate $B2$) in fiber-reinforced resin forming material×100 (3)

How to Evaluate Mechanical Properties

Die No. 1 capable of making a flat plate is used. The fiber-reinforced resin forming material is placed at the center (about 50% in terms of charge rate) of Die No. 1 and is pressurized at 10 MPa with a compression type pressing machine to be cured at about 130° C. for 6 minutes to prepare a flat plate of 300×400 mm. Five samples of 100×25×1.6 mm are clipped out of the flat plate in each direction of 0 degree (flat plate longitudinal direction) and 90 degrees into total 10 samples to be measured according to JIS K7074 (1988).

How to Evaluate Flow Properties

Die No. 2 having irregularity parts and a rib-forming groove is used. The fiber-reinforced resin forming material is placed at the center (about 50% in terms of charge rate) of Die No. 2 and is pressurized at 10 MPa with a compression type pressing machine to be cured at about 130° C. for 6 minutes to prepare a formed product. The formed product is visually observed with respect to evaluation items shown in Table 1 for a general evaluation of flow properties with each formed product.

TABLE 1

| Evaluation item | |
| --- | --- |
| Excellent | No underfill, Excellent surface appearance |
| Good | No underfill, Good fluidity with tiny partial wrinkle on surface |
| Acceptable | No underfill, Partial wrinkle or swell on surface |
| NG | Underfill existing in product |

Example 1

The above-described "Panex R 35 Tow" was employed as a carbon fiber. A continuous fiber strand to which the splitting treatment was performed was prepared by blowing air periodically and locally in a direction orthogonally to the fiber longitudinal direction of continuous reinforcing fiber, and then cut and spread to uniformly disperse to prepare a discontinuous carbon fiber nonwoven fabric of which fibers were isotropically oriented. A rotary-type cutter was used as a cutting machine. The distance of blades was set to 30 mm. The discontinuous carbon fiber nonwoven fabric had areal weight of 1 kg/m².

The discontinuous carbon fiber nonwoven fabric was impregnated by a roller with 100 parts by weight of matrix resin and a resin containing 1 part by weight of curing agent and 7 parts by weight of thickener to prepare a sheet-like fiber-reinforced resin forming material. The fiber-reinforced resin forming material had 40% of carbon fiber weight content and 1.46 g/cm³ of density. The measurement result of weight ratio B was 55% while the measurement result of weight ratio B1 was 100%. Samples were clipped out of the flat plate formed with die No. 1 to be measured according to JIS K7074 (1988) to find that the bending strength is 420 MPa. Further, the product formed with die No. 2 had a good surface appearance without observing underfill and swell, although tiny wrinkle was partially generated on the surface.

Example 2

Conditions were the same as Example 1, except for 8% of weight ratio B1.

Comparative Example 1

Conditions were the same as Example 1, except for 3% of weight ratio B and 0% of weight ratio B1.

Comparative Example 2

Conditions were the same as Example 1, except for 0% of weight ratio B1.

Comparative Example 3

Conditions were the same as Example 1, except for 97% of weight ratio B and 0% of weight ratio B1.

TABLE 2

| | Example 1 | Example 2 | Comparative Example 1 | Comparative Example 2 | Comparative Example 3 |
| --- | --- | --- | --- | --- | --- |
| Split number [pieces] | 4K | 4K | 4K | 4K | 4K |
| Weight ratio B [%] | 55 | 55 | 3 | 55 | 97 |
| Weight ratio B1 [%] | 100 | 8 | 0 | 0 | 0 |
| Strength [MPa] | 420 | 354 | 401 | 273 | 270 |
| Fluidity | Good | Good | NG | Good | Excellent |

Table 2 shows that Examples 1 and 2 achieved both a good fluidity in forming process and excellent mechanical properties of formed product in a balanced manner in comparison with Comparative Examples 1, 2 and 3.

INDUSTRIAL APPLICATIONS

Our materials and methods are applicable to various fiber-reinforced resin forming materials expected to be capable of achieving both good fluidity in forming products and excellent mechanical properties of the product in a balanced manner.

The invention claimed is:

1. A fiber-reinforced resin forming material containing at least a bundled aggregate of discontinuous reinforcing fibers and a matrix resin, wherein
the bundled aggregate of reinforcing fibers includes both
a reinforcing fiber aggregate A formed by cutting a strand of continuous reinforcing fibers after a splitting treatment is performed to completely split the strand into a plurality of bundles, and
a reinforcing fiber aggregate B1 having a shape of an unsplit part to which the splitting treatment is not complete and/or
a reinforcing fiber aggregate B2 having a shape to which the splitting treatment is not performed, wherein
both a ratio (i) of weight of the reinforcing fiber aggregate B1 with respect to a total weight of reinforcing fibers in the fiber-reinforced resin forming material, and a ratio (ii) of a total weight of the reinforcing fiber aggregate B1 and the reinforcing fiber aggregate B2 with respect to the total weight of reinforcing fibers in the fiber-reinforced resin forming material, are 50 to 95%, and
a ratio of the weight of the reinforcing fiber aggregate B1 with respect to the total weight of the reinforcing fiber aggregate B1 and the reinforcing fiber aggregate B2 is more than 4%.

2. The fiber-reinforced resin forming material according to claim 1, wherein the reinforcing fiber aggregate A, the reinforcing fiber aggregate B1 and the reinforcing fiber aggregate B2 have an average fiber length of 5 to 100 mm.

3. The fiber-reinforced resin forming material according to claim 1, wherein the reinforcing fiber aggregate A has a number of single yarns of 800 to 10,000 pieces.

4. The fiber-reinforced resin forming material according to claim 1, wherein the reinforcing fiber comprises a carbon fiber.

5. The fiber-reinforced resin forming material according to claim 1, wherein the matrix resin comprises a thermosetting resin or a thermoplastic resin.

* * * * *